US011735138B2

(12) United States Patent
Seder et al.

(10) Patent No.: US 11,735,138 B2
(45) Date of Patent: Aug. 22, 2023

(54) DUAL IMAGE PLANE HUD WITH AUTOMATED ILLUMINANCE SETTING FOR AR GRAPHICS DISPLAYED IN FAR VIRTUAL IMAGE PLANE

(71) Applicant: GM GLOBAL TECHNOLOGY OPERATIONS LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 17/237,864

(22) Filed: Apr. 22, 2021

(65) Prior Publication Data

US 2022/0343876 A1 Oct. 27, 2022

(51) Int. Cl.
*G09G 5/10* (2006.01)
*B60K 35/00* (2006.01)
*G02B 27/01* (2006.01)

(52) U.S. Cl.
CPC .............. *G09G 5/10* (2013.01); *B60K 35/00* (2013.01); *G02B 27/0101* (2013.01); *B60K 2370/1529* (2019.05); *B60K 2370/164* (2019.05); *B60K 2370/166* (2019.05); *B60K 2370/167* (2019.05); *B60K 2370/177* (2019.05); *B60K 2370/178* (2019.05); *B60K 2370/345* (2019.05); *G02B 2027/0118* (2013.01); *G09G 2320/0606* (2013.01); *G09G 2320/066* (2013.01); *G09G 2360/144* (2013.01); *G09G 2380/10* (2013.01)

(58) Field of Classification Search
None
See application file for complete search history.

(56) References Cited

U.S. PATENT DOCUMENTS

| 6,084,594 | A | * | 7/2000 | Goto | G06T 19/00 |
| | | | | | 345/9 |
| 9,691,182 | B1 | * | 6/2017 | Katzer | G02B 27/017 |
| 10,260,864 | B2 | * | 4/2019 | Edwin | G06F 3/013 |
| 2009/0327890 | A1 | * | 12/2009 | Mertz | G16H 50/20 |
| | | | | | 715/762 |
| 2011/0075257 | A1 | * | 3/2011 | Hua | G02B 26/004 |
| | | | | | 359/464 |
| 2011/0246934 | A1 | * | 10/2011 | Nakagawa | B60K 37/06 |
| | | | | | 715/802 |
| 2012/0008048 | A1 | * | 1/2012 | Sekine | G06T 19/006 |
| | | | | | 348/565 |

(Continued)

*Primary Examiner* — Jason A Pringle-Parker (57) ABSTRACT

A projection system includes a projection device and a control module. The projection device is configured to project (i) a first image in a first virtual image plane, and (ii) a second image in a second virtual image plane, wherein the second virtual image plane is further from an eyebox than the first virtual image plane. The control module is configured to: determine an ambient light luminance level; determine a first luminance level for the first virtual image plane based on the ambient light luminance level; determine a second luminance level of the second virtual image plane based on the first luminance level of the first virtual image plane; and control the at least one projection device to display (i) the first image in the first virtual image plane having the first luminance level, and (ii) the second image in the second virtual image plane having the second luminance level.

19 Claims, 5 Drawing Sheets

(56) References Cited

U.S. PATENT DOCUMENTS

| | | | |
|---|---|---|---|
| 2013/0002524 A1* | 1/2013 | Sirpal | G06F 1/1616 345/1.3 |
| 2013/0083063 A1* | 4/2013 | Geisner | G09G 5/363 345/633 |
| 2013/0222410 A1* | 8/2013 | Kameyama | H04N 13/344 345/589 |
| 2015/0191075 A1* | 7/2015 | Fueller | G09G 5/14 349/16 |
| 2015/0205135 A1* | 7/2015 | Border | G06V 20/20 359/630 |
| 2015/0317837 A1* | 11/2015 | Sholudko | G06F 3/005 345/633 |
| 2016/0133006 A1* | 5/2016 | Li | G06T 11/00 382/154 |
| 2017/0154464 A1* | 6/2017 | Lanier | G02B 27/1006 |
| 2017/0161009 A1* | 6/2017 | Ogisu | G02B 27/0101 |
| 2018/0103243 A1* | 4/2018 | Lee | G06T 5/50 |
| 2018/0157036 A1* | 6/2018 | Choi | G09G 3/001 |
| 2018/0276898 A1* | 9/2018 | Nishizawa | G06T 19/006 |
| 2019/0101751 A1* | 4/2019 | Chou | G09G 3/02 |
| 2019/0260931 A1* | 8/2019 | Rodriguez | H04N 23/65 |
| 2020/0090403 A1* | 3/2020 | Ishida | G09G 5/36 |
| 2020/0111259 A1* | 4/2020 | Sears | G02B 27/0172 |
| 2020/0387708 A1* | 12/2020 | Candelore | G06V 10/60 |
| 2021/0055548 A1* | 2/2021 | Rao | G02B 7/04 |

\* cited by examiner

DUAL IMAGE PLANE HUD WITH AUTOMATED ILLUMINANCE SETTING FOR AR GRAPHICS DISPLAYED IN FAR VIRTUAL IMAGE PLANE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to dual-plane projection systems for head-up displays of vehicles.

Display devices are used in a variety of applications. Some example display devices are flat panel displays, projection displays, and head-up displays. Display devices can either be of a transmission or reflection type.

A driver of a vehicle traditionally views surroundings of a vehicle through windows, windshields, and other glass of the vehicle. The driver may control vehicle acceleration, deceleration, and steering based on the driver's visual observation of the surroundings of the vehicle. The vehicle may include one or more displays that display various information to the driver. For example, some vehicles include an infotainment system that includes a display that displays various infotainment and other vehicle information. The vehicle may also include a head-up display (HUD) that displays information by forming a virtual image at a certain distance with reflection of a windshield. For example, the HUD may display a vehicle speed and other vehicle information (e.g., warnings such as lane departure warnings and collision avoidance warnings).

SUMMARY

A projection system is provided and includes at least one projection device and a control module. The at least one projection device is configured to project (i) a first image in a first virtual image plane, and (ii) a second image in a second virtual image plane, where the second virtual image plane is further from an eyebox than the first virtual image plane. The control module is configured to: determine an ambient light luminance level; determine a first luminance level for the first virtual image plane based on the ambient light luminance level; determine a second luminance level of the second virtual image plane based on the first luminance level of the first virtual image plane; and control the at least one projection device to display (i) the first image in the first virtual image plane having the first luminance level, and (ii) the second image in the second virtual image plane having the second luminance level.

In other features, the projection system of claim 1, further includes an ambient light sensor configured to generate an output signal indicative of the ambient light luminance level. The control module is configured to determine the ambient light luminance level based on the output signal.

In other features, the control module is configured to: determine a luminance threshold for cognitive capture based on the ambient light luminance level; and determine the second luminance level based on the luminance threshold.

In other features, the control module is configured to set the second luminance level of the second virtual image plane such that a contrast ratio between the second virtual image plane and a road surface is between 1.2:1 and 10:1.

In other features, the control module is configured to: determine whether the ambient light luminance level is less than a predetermined level associated with nighttime; and in response to detecting that it is nighttime, set the second luminance level of the second virtual image plane such that a contrast ratio between the second virtual image plane and a road surface is between 1.2:1 and 10:1.

In other features, the control module is configured to: determine an augmented reality application for the second virtual image plane to be a navigation application; and based on the augmented reality application being the navigation application, set the second luminance level of the second virtual image plane to be less than or equal to the at least one of (i) the detected luminance level of a lane line marker, or (ii) the predetermined luminance level of a lane line marker.

In other features, the control module is configured to: determine an augmented reality application for the second virtual image plane; and based on the augmented reality application, at least one of (i) set the second luminance level of the second virtual image plane, or (ii) select a grayscale from multiple available grayscales for the second virtual image plane.

In other features, the control module is configured to: determine whether the ambient light luminance level is greater than a predetermined level associated with daytime; and in response to detecting that it is daytime, limit the second luminance level of the second virtual image plane to be less than or equal to 10000 cd/m$^2$.

In other features, the control module is configured to: determine whether the ambient light luminance level is greater than a predetermined level associated with daytime; and in response to detecting that it is daytime, control the second luminance level of the second virtual image plane to at least one of (i) provide a nominal day luminance level of the second virtual image plane to be within a predetermined range of 2400 cd/m$^2$, or (ii) have a contrast ratio between a luminance level of augmented reality graphics displayed in the second virtual image plane and a luminance level of a surface of a road be 1.2:1 to 10:1.

In other features, the control module is configured to: determine an augmented reality application for the second virtual image plane is a navigation application; and based on the augmented reality application being the navigation application, control the second luminance level of the second virtual image plane to at least one of (i) provide the nominal day luminance level of the second virtual image plane to be within the predetermined range of 2400 cd/m$^2$, or (ii) have the contrast ratio between the luminance level of the augmented reality graphics displayed in the second virtual image plane and the luminance level of the surface of the road be 1.2:1 to 10:1.

In other features, the control module is configured to set the second luminance level of the second virtual image plane such that a first ratio between the second luminance level of the second virtual image plane and the first luminance level of the first virtual image plane exists for a first range of luminance levels of the first virtual image plane and is greater than the first ratio for a second range of luminance levels of the first virtual image plane.

In other features, the control module is configured to permit a user to manually adjust the second luminance level of the second virtual image plane independent of the first luminance level of the first virtual image plane.

In other features, the control module is configured to prevent a user from manually adjusting the second luminance level of the second virtual image plane independent of the first luminance level of the first virtual image plane.

In other features, a vehicle system is provided and includes the projection system and an input device. The projection system is configured to project the first image and the second image at a window of a vehicle. The input device is configured to manually adjust the first luminance level of the first virtual image plane. The control module is configured to adjust the first luminance level of the first virtual image plane based on an output of the input device.

In other features, a method of operating a projection system is provided. The method includes: determining an ambient light luminance level; determining a first luminance level of a first virtual image plane based on the ambient light luminance level; determining a second luminance level of a second virtual image plane based on the first luminance level of the first virtual image plane, where the second virtual image plane is further from an eyebox than the first virtual image plane; and controlling the a projection device to project (i) a first image in the first virtual image plane, and (ii) a second image in the second virtual image plane, where the first image is displayed in the first virtual image plane having the first luminance level, and where the second image is displayed in the second virtual image plane and having the second luminance level.

In other features, the method further includes setting the second luminance level of the second virtual image plane to less than or equal to at least one of (i) a detected luminance level of a lane line marker, or (ii) a predetermined luminance level of a lane line marker.

In other features, the method further includes: determining whether the ambient light luminance level is less than a predetermined level associated with nighttime; determining an augmented reality application for the second virtual image plane to be a navigation application; and in response to detecting that it is nighttime and based on the augmented reality application being the navigation application, setting the second luminance level of the second virtual image plane to be less than or equal to the at least one of (i) the detected luminance level of a lane line marker, or (ii) the predetermined luminance level of a lane line marker.

In other features, the method further includes: determining an augmented reality application for the second virtual image plane; and based on the augmented reality application, at least one of (i) setting the second luminance level of the second virtual image plane, or (ii) selecting a grayscale from multiple available grayscales for the second virtual image plane.

In other features, the method further includes: determining whether the ambient light luminance level is greater than a predetermined level associated with daytime; and in response to detecting that it is daytime, limiting the second luminance level of the second virtual image plane to be less than or equal to 5000 cd/m$^2$.

In other features, the method further includes setting the second luminance level of the second virtual image plane such that a ratio between the second luminance level of the second virtual image plane and the first luminance level of the first virtual image plane is 2:1 for a first range of luminance levels of the first virtual image plane and is greater than 2:1 for a second range of luminance levels of the first virtual image plane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
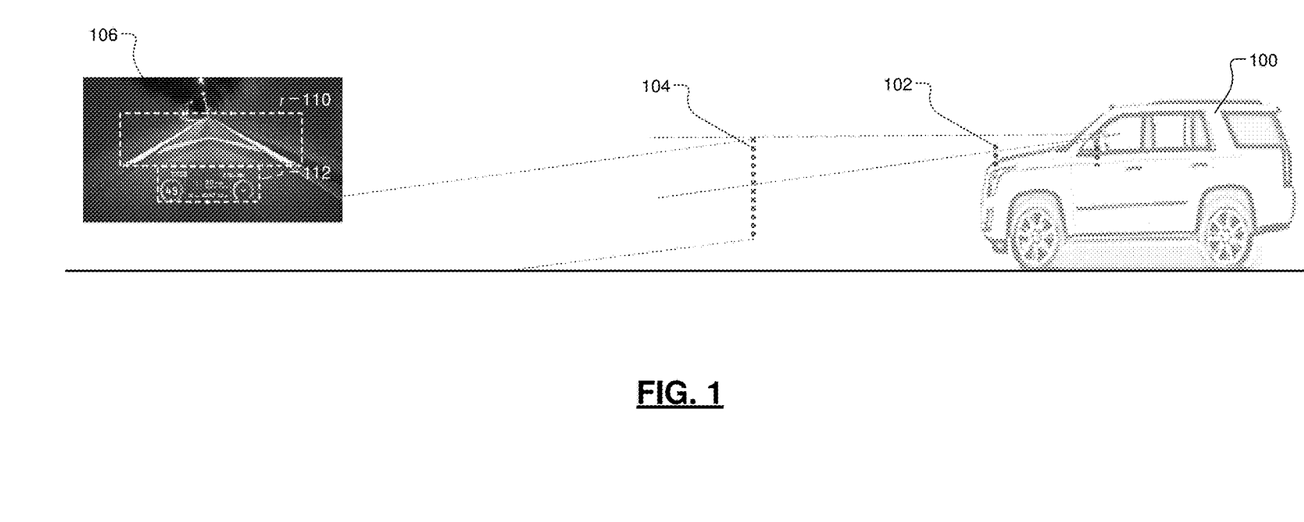
FIG. 1 is a virtual image plane diagram illustrating near and far virtual image planes of a holographic head up display (HUD)

A dual-plane projection system, such as that provided in a dual-plane holographic HUD, can be used to display images at two different virtual image planes. For example, a near virtual image plane (hereinafter referred to as a near image plane (NIP)) may be used to display vehicle information, such as vehicle status information, vehicle speed, radio stations, indoor and/or outdoor temperatures, warning indications, etc. A far virtual image plane (hereinafter referred to as a far image plane (FIP)) may be used to display various other information for augmented reality purposes. For example, the dual-plane projection system may be used to display advertisements, information regarding objects in a surrounding environment, advanced driver assistance (ADAS) information such as collision alert information, point-of-interest (POI) information, navigation information, etc. FIG. 1 shows an example vehicle 100 including a holographic HUD that displays images in a NIP and in a FIP. The NIP is represented by dashed line 102 and the FIP is represented by dashed line 104. The NIP may be 2.3-2.5 meters forward of an eyebox (or eyes) of a vehicle driver. The FIP may be 7 or more meters forward of the eyebox.

An example view 106 of an area forward of the vehicle 100 is shown. Dashed box 110 refers to a far image displayed in a FIP and over the environment to provide an enhanced view (or augmented reality). In the example shown, lane markers and a direction indicator are displayed on the road ahead. Dashed box 112 refers to a near image displayed in a NIP and over the environment to provide vehicle information, such as vehicle status information.

The NIP has a small field of view (FOV) as compared to the FIP. The near image is displayed at a high look down angle relative to a horizontal plane that extends at an eye height level and/or through a middle of a corresponding eyebox. The FIP includes augmented reality (AR) information displayed over a wide FOV and at a lower look down angle than that of the near image. Because the AR information is close to a driver's horizontal sight line, display of images in the FIP at high luminance levels can be distracting to the driver. In addition, physiological cues for distance perception, such as accommodation, vergence, and disparity, all become ineffective beyond 6 meters. AR HUDs typically position a wide FOV virtual image at distances beyond 7 meters, which enables AR graphics to become "fused" with the real world.

The examples set forth herein include a projection system implementing an augmented reality graphics method including grayscale dimming to control a luminance range of a far image in FIP. Luminance levels of AR graphics in the FIP are controlled and limited to prevent distracting a driver. The luminance levels of the AR graphics and the FIP are not user selectable and are prevented from being directly and/or independently adjusted by a driver. This prevents a driver from "cranking up" luminance levels of a FIP and causing distracting images in the FIP to be presented to the driver. The projection system displays AR graphics in the FIP and adjusts luminance of the AR graphics to increase saliency while avoiding cognitive capture. The increased saliency may be of highlighted objects. Object highlighting may refer to the display of one or more AR graphics to identify and/or point out an object in an environment. Cognitive capture (also referred to as cognitive tunneling), in the context of the present application, refers to is an inattentional blindness phenomenon in which a driver is too focused on the AR graphics displayed and not focused enough on and/or aware of other aspects of a present environment.

The AR graphics method leverages human factors and perception principals to determine luminance levels of AR graphics for the FIP, which increases highlighted object saliency while limiting the luminance of the AR graphics to below a luminance threshold for cognitive capture. The luminance of the AR graphics is set low relative to ambient lighting to provide a low contrast ratio to avoid cognitive capture while being set high enough to enhance salience of highlighted objects. The luminance of the AR graphics is adjusted based on changes in ambient luminance to maintain the low contrast ratio and enhance salience of AR graphics. The luminance threshold for cognitive capture varies and is set based on a detected ambient luminance level. Because the luminance threshold for cognitive capture varies with ambient luminance, the method automatically adjusts the luminance of the AR graphics to continue to prevent occurrence of cognitive capture.

For safety, the luminance of the AR graphics are not user adjustable and are instead determined based on the output of an ambient light sensor. Luminance of NIP images is also adjusted based on the output of the ambient light sensor.

Figure 2:
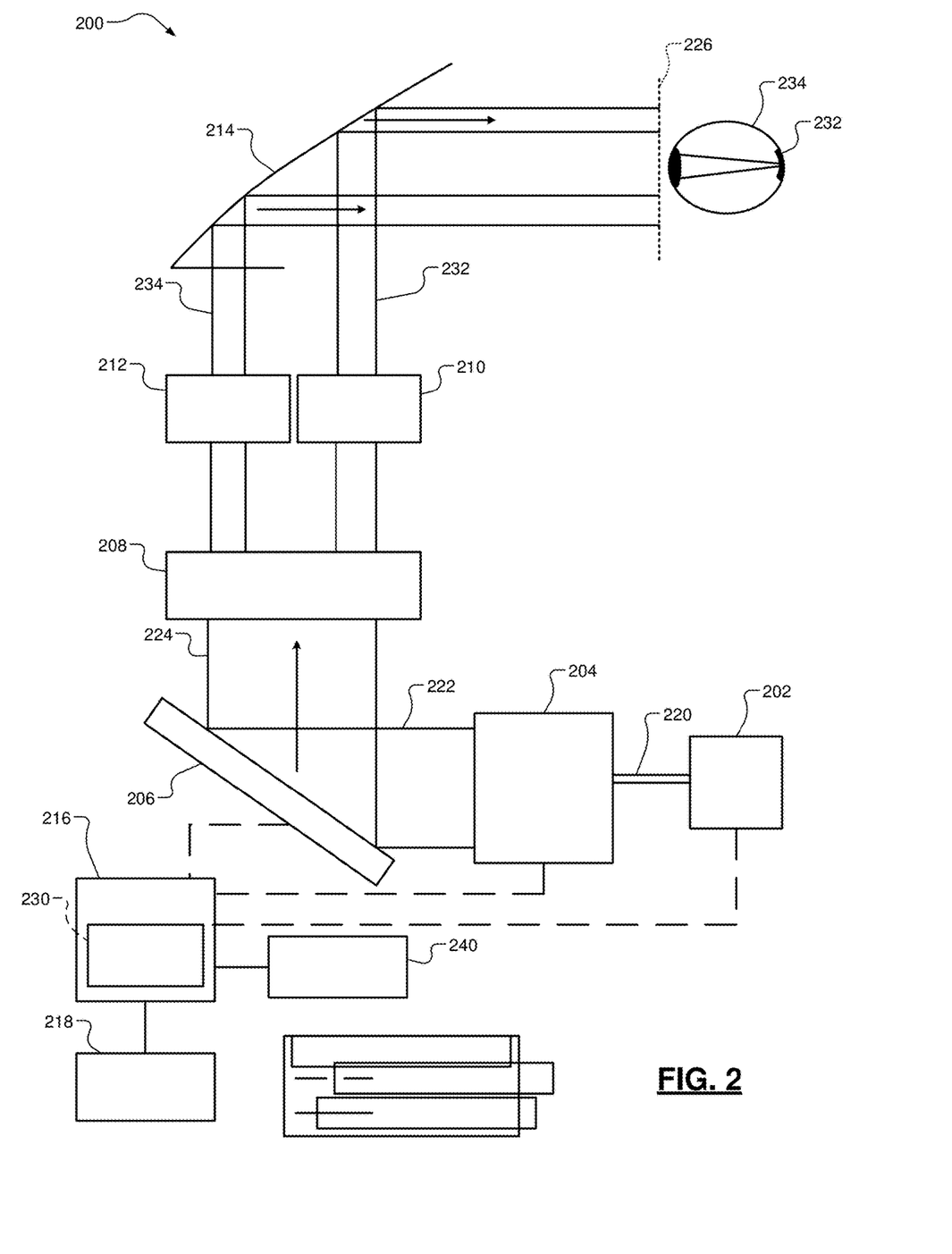
FIG. 2 is a functional block diagram of an example holographic projection system including a control module implementing an augmented reality graphics method in accordance with the present disclosure.

FIG. 2 shows a projection system 200. The projection system 200 is provided as an example of a dual plane projection system. Although the projection system 200 is shown as a holographic projection system, the examples disclosed herein are applicable to other types of dual plane projections systems. The projection system 200 may include one or more light (or laser) sources 202, a beam expander 204, a spatial light modulator (SLM) 206, a diffuser 208, first magnification optics 210, second magnification optics 212, a windshield (or reflector) 214, a control module 216, and an ambient light sensor 218. The light sources 202 generate a light beam 220, which is received at the beam expander 204. The beam expander 204 expands a width of the light beam 220 to provide an expanded beam 222. The SLM 206 receives the expanded beam 222 and is encoded with one or more graphic holograms via the control module 216 and provides a modulated beam 224 including multiple images. The multiple images include a first (or near) image for display in a NIP and a second (or far) image for display in a FIP. In one embodiment, the beam expander 204 is not included and the output of the light sources 202 is received at the SLM 206. The control module 216 may include one or more display drivers 230 for controlling states of the SLM 206.

The output of the SLM 206 is received at the diffuser 208. Two optical paths are provided at the output of the diffuser 208. Two images (e.g., a far image and a near image) are received and projected from the diffuser 208 via the respective optical paths to the windshield 214. The diffuser 208 receives the images including a first (or far) image that is provided to a first optical path and a second (or near) image that is provided to a second optical path. The optical paths respectively include the first magnification optics 210 and the second magnification optics 212. The magnification optics 210, 212 may include respective mirrors with respective curvatures, lenses, and/or other optical components. The first and second images are provided in respective projected beams 232, 234 to an eyebox. The SLM 206 is encoded with one or more graphic holograms via the control module 216 and provides two projected beams, which are seen by the retina 232 of a viewer's eye 234. The projected beams 232, 234 are reflected off the windshield 214 and projected to the eyebox. A front of the eyebox is designated by focal plane 236. The eyebox refers to an area in which one or more eyes of a person are located.

In another embodiment in which the projection system 200 is not a holographic projection system, the light source 202, the beam expander 204, the SLM 206 and the diffuser 208 are replaced with a thin film transistor (TFT) liquid crystal display (LCD), which is controlled by the control module 216. The control module 216 controls the TFT LCD to generate the two projected beams. The light source 202, the beam expander 204, the SLM 206, the diffuser 208 and the TFT LCD may be referred to as a projection devices and/or a projection circuit.

The control module 216 executes an AR graphics method (or algorithm) that automatically adjusts the luminance level of AR graphics in a FIP. An example of the AR graphics method is described below with respect to FIG. 4. As a couple of examples, the luminance level of the AR graphics may be adjusted by adjusting current levels of the light sources 202 and/or by adjusting how the AR graphics are generated (e.g., adjusting modulation and/or operation of the SLM 206). The adjustment of the luminance of the AR graphics is based on a luminance level of graphics displayed in a NIP.

The luminance level of the NIP may be automatically adjusted based on an ambient luminance level as detected via the ambient light sensor 218 and manually adjusted via an input device 240. The ambient light sensor 218 may be embedded within the corresponding HUD and/or projection system 200. The input device 240 may include one or more buttons, dials, a touchscreen, one or more switches, a microphone, etc. for adjusting luminance and brightness of the near image displayed in the NIP. In one embodiment, the control module 216 assigns a unique luminance range to each of multiple AR applications and corresponding AR graphics sets being displayed in the FIP. The control module 216 implements grayscale dimming to control the luminance range of the AR graphics displayed in the FIP. The projection system 200 may also include a camera for detecting luminance levels of objects, such as lane line markings.

The control module 216 prevents a user from directly and/or independently adjusting luminance levels of the FIP and thus luminance levels of far images and associated AR graphics. In one embodiment, the projection system 200 may not include an input device, a circuit, and/or control logic for allowing the directly and/or independently adjusting luminance levels of the FIP. In another embodiment, the projection system 200 does include an input device, a circuit and/or control logic that allows a technician, while for example testing the projection system 200, to directly and/or independently adjusting luminance levels of the FIP. In this embodiment, the projection system 200 prevents a driver and/or other unauthorized user from directly and/or independently adjusting luminance levels of the FIP. The technician may be required to provide a particular username, password, code, etc. via, for example, a diagnostic tool in order to enable the adjustment.

Figure 3:
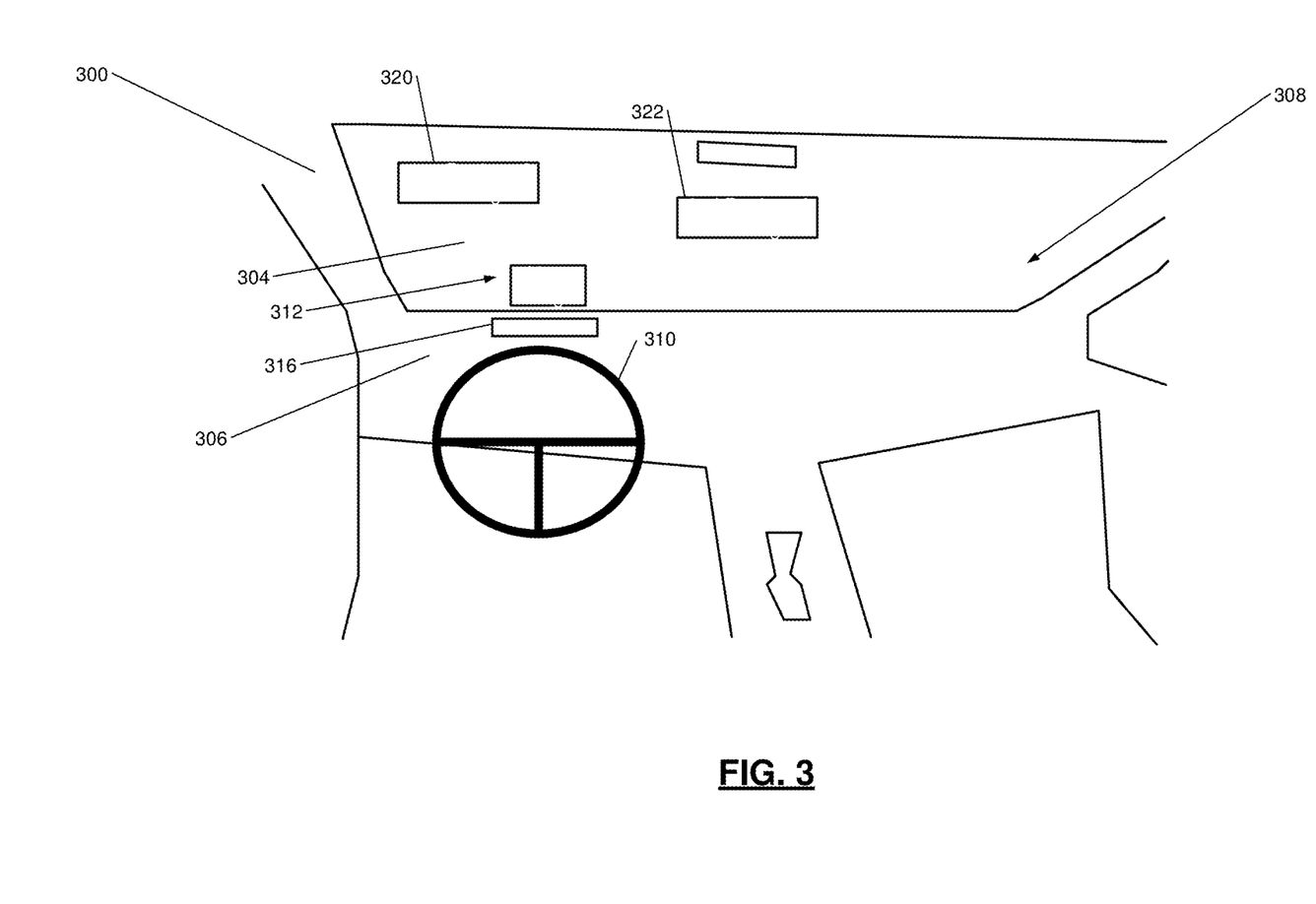
FIG. 3 is a perspective view of an example interior of a vehicle including the holographic projection system of FIG. 2.

FIG. 3 shows an example perspective view from a driver seat of a vehicle 300. The vehicle 300 includes a windshield 304 located in a front opening of the vehicle 300. Passengers within a passenger cabin 308 of the vehicle 300 can look through the windshield 404 to see in front of the vehicle 300. While the example of a land-based vehicle is described, the present application is also applicable to air-based vehicles (e.g., airplanes, helicopters, etc.) and water-based vehicles (e.g., boats, etc.). Also, although some examples are disclosed herein with respect to vehicle implementations, the examples are applicable to non-vehicle implementations.

As shown in FIG. 3, the windshield 304 is visually located above a dashboard 306 of the vehicle 300. The vehicle 300 may include a steering wheel 310. The vehicle 300 may be an autonomous vehicle, a semi-autonomous vehicle, or a non-autonomous vehicle.

A HUD including a holographic projection system, such as that described above with respect to FIG. 2, projects a near image (or first near hologram) 312 onto a portion of the windshield 304 through an aperture 316 in the dashboard 306. The near image is shown in a near virtual image plane, such as that shown in FIG. 1. When the vehicle is in use, the near image 312 includes various vehicle information, such as a present speed of the vehicle 300, a present gear of a transmission of the vehicle 300, an engine speed, a directional heading of the vehicle 300, present infotainment system settings, and/or other vehicle information. The near image 312 presents data to the driver of the vehicle without the driver having to look away from objects in front of the vehicle. The HUD also projects a far image, which may include a first portion 320 and a second portion 322 as shown. The far image is displayed in a far virtual image plane, such as shown in FIG. 1. The portions 320, 322 and/or other portions may include various information, indicators, markings, etc. to provide an augmented reality and enhance the driving experience. The input device 240 of FIG. 2 may be included in the dashboard 306.

Figure 4:
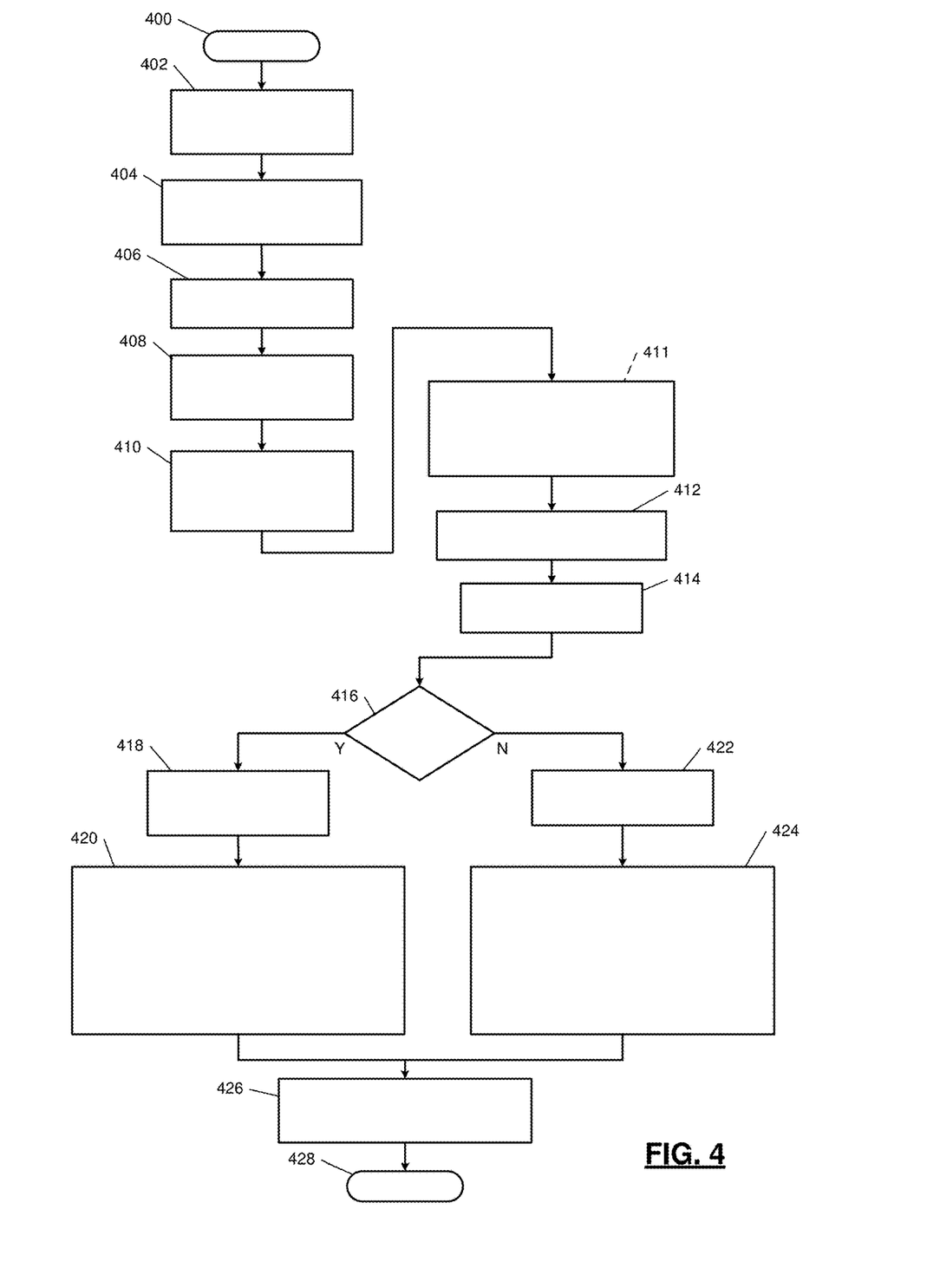
FIG. 4 illustrates an augmented reality graphics method including grayscale dimming to control a luminance range of a far image in far virtual image plane in accordance with the present disclosure.

FIG. 4 shows an augmented reality graphics method including grayscale dimming to control a luminance range of a far image in a FIP. The method is a human-factors-based method (or algorithm) for controlling luminance of AR graphics that concurrently increases object highlighting saliency and avoids luminance threshold for cognitive capture. The algorithm adjusts luminance of the AR graphics based on ambient luminance and includes grayscale dimming to refine/tailor the luminance for AR graphics set for various different AR applications. Grayscale dimming refers to the application of a selected grayscale from multiple different grayscales. Each of the grayscales has a lower luminance range than a grayscale set for a NIP. Although the following operations are primarily described with respect to the implementation of FIG. 2, the operations may be easily modified to apply to other implementations of the present disclosure. The operations of the method may be iteratively performed.

The method may begin at 400. At 402, the control module 216 displays a near image in the NIP. At 404, the control module 216 receives an input to adjust a brightness (or intensity) level of the near image. The input may be in the form of a luminance control voltage V. At 406, the control module 216 receives an output of the ambient light sensor 218. The output of the ambient light sensor 218 is indicative of an ambient light condition external to the corresponding vehicle. The output may be converted to a luminance value of the environment external to and/or forward of the vehicle.

At 408, the control module 216 may determine (i) a luminance level of the environment based on the output of the ambient light sensor, and (ii) a luminance level of the NIP if not already known and/or determined. At 410, the control module 216, adjusts the luminance of the near image based on (i) the luminance level of the environment, (ii) the determined and/or known luminance level of the NIP, and (iii) the input to adjust the brightness level. By adjusting the luminance level of the near image, the control module 216 adjusts the brightness of the near image. At 411, the control module 216 may determine a luminance threshold for cognitive capture based on luminance of ambient light, such as the luminance level of the environment.

At 412, the control module 216 determines one or more applications of one or more far images to be displayed in the FIP. One or more of various applications may be selected based on a current situation and/or condition the vehicle is experiencing. For example, the control module 216 may select a forward collision alert (FCA) application, a point-of-interest (POI) application, a navigation application, and/or other application. The FCA application may be selected when, for example, collision warning information is to be displayed due to detection of an impending collision. A POI application may be selected when, for example, displaying information regarding a POI, such as a building, a monument, a store, a park, a fire station, a police station, a hospital, a school, etc. A navigation application may be selected when, for example, displaying navigation information to direct a driver to a selected geographical location.

Figure 5:
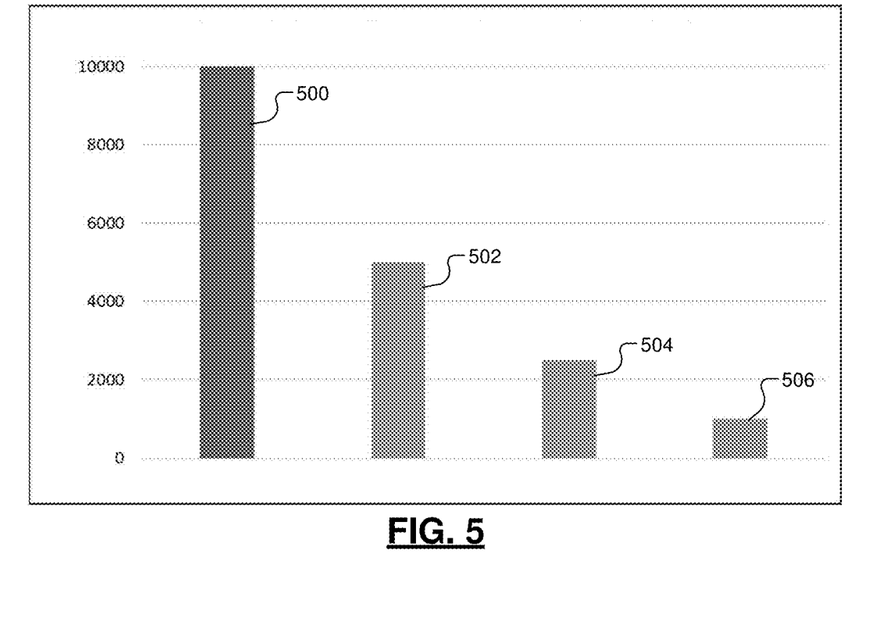
FIG. 5 is an example bar graph of near and far virtual image plane luminance values versus a luminance range with grayscale dimming in accordance with the present disclosure.

At 414, the control module 216 may select a unique and/or designated grayscale for the application selected. The grayscale may have a unique and/or designated maximum luminance level. FIG. 5 shows a bar graph of example near and far virtual image plane luminance values versus a luminance range with grayscale dimming. A first bar 500 is shown with a grayscale set for a NIP based on the luminance control voltage received from the input device 240, the output of the ambient light sensor 218 and/or the luminance level of the environment external to the vehicle. In FIG. 5, GS refers to a particular grayscale having a peak luminance value. GS255 refers to a grayscale with a peak grayscale value of 255. GS150 and GS100 refer to other grayscales with peak grayscale values of 150 and 100, respectively. The peak grayscale values 255, 150, 100 have respective peak luminance values. Bars 502, 504, 506 are example grayscale ranges for different AR graphics applications, specifically, FCA, POI and navigation (NAV). The unit of measure of luminance is a nit or candela per square meter ($cd/m^2$).

Each application is designated a particular luminance range. In one embodiment, all of the applications have different grayscale luminance ranges. For the same application, different luminance ranges may be provided for NIP and FIP. For example, in the example of FIG. 5, a luminance maximum $L_{max}$ for the NIP is 10,000 cd/m2 for GS255 and the corresponding luminance maximum $L_{max}$ for the FIP is 5,000 cd/m² for GS255. The FCA application may be designated GS255 for the FIP. GS255 may be too bright for other applications. As a result, the grayscales for the other applications may be lower. The grayscales are selected to avoid distracting a driver by display of AR graphics in the FIP. GS150 and GS100 may be designated for the POI and NAV applications. Thus, not all 256 grayscale settings are available for all applications of far images displayed in the FIP.

At 416, the control module 216 determines whether it is currently nighttime. Nighttime referring to when the luminance level of ambient light external to the vehicle is below a predetermined level. This determination may be based on the output of the ambient light sensor 218 and/or the determined luminance levels of the environment. Luminance is equal to a product of reflectance (or reflectivity) ρ and illuminance E divided by π (or ρE/π). The units of measure of illuminance E is lumens per square meter (lm/m²). Sources of light during the daytime may be the sun, headlights, streetlights, etc. Sources of light during the evening may be headlights, streetlights, etc. Light may also be reflected off objects, such as the moon, clouds, reflective markings, etc. and as a result be sources of light.

At 418, the control module 216 determines a luminance level of lane line markings, which may be used as a luminance reference level for nighttime driving based on which a luminance level of AR graphics may be determined. The luminance level of the lane line marker may be detected via a sensor, such as the camera 242 or may be a predetermined stored estimated level. As an example, the lane line markings may be white and have a luminance level of 130 cd/m² when illuminated by headlights of the vehicle. For nighttime driving, luminance of FIP navigation graphics may be limited to being no brighter than the lane line markings. The contrast ratio between white lane line markings and a portion of a surface of a corresponding road that does not include a lane line marking may be 3:1. For nighttime driving luminance of the FIP is limited to being less than or equal to a limit value that is much less than 130 cd/m². For example, the limit value may be less than half the luminance of the lane line markings and/or less than 130/2 cd/m² (or 65 cd/m²).

At 420, the control module 216 determines a luminance level to set the FIP based on the luminance level of the NIP, the luminance threshold for cognitive capture, and/or the selected grayscale. This is done while limiting the luminance level of the FIP to a luminance level less than the luminance level of the lane line markings and/or a predetermined maximum luminance level. The luminance level of the lane line marking may be equal to the luminance threshold for cognitive capture in which case operation 411 may not be performed. A mathematical relationship, a lookup table, and/or other manner of relating luminance levels of the NIP to luminance levels of the FIP may be used. Some examples of which are described below.

Table 1 is an example table for determining a maximum FIP luminance level based on a NIP:FIP ratio and a maximum NIP luminance.

TABLE 1

NIP and FIP Luminance Relationships

| NIP Luminance Control Voltage V Percentage | Max NIP Luminance cd/m² | Max FIP Luminance cd/m² | NIP:FIP | Road Luminance cd/m² | FIP Contrast Ratio |
|---|---|---|---|---|---|
| 100 | 10000 | 5000 | 2.00 | 800 | 6.25 |
| 80 | 6121 | 3061 | 2.00 | | |
| 65 | 3877 | 1939 | 2.00 | | |
| 50 | 2178 | 1089 | 2.00 | | |
| 40 | 1334 | 667 | 2.00 | | |
| 30 | 709 | 355 | 2.00 | | |
| 20 | 292 | 130 | 2.25 | | |
| 10 | 65 | 25 | 2.60 | | |
| 5 | 16 | 5 | 3.15 | | |
| 0 | 2 | 0.5 | 4.00 | | |

The NIP luminance control voltage V may be generated by the input device 240 or the control module 216 in response to the output of the input device 240. The luminance control voltage may have a voltage range corresponding to a 0-100% luminance, where 0% is dark and 100% is a peak luminance setting. For the example shown, when the selected percentage is 0, then the minimum luminance $L_{min}$ is equal to 2 cd/m² for the NIP. When the selected percentage is 100%, then the maximum luminance $L_{max}$ is equal to 10000 cd/m² for the NIP. A relationship between the luminance control voltage and the commanded luminance may be represented by equation 1, where $L_x$ is the commanded luminance level, a is a constant, gamma (γ) equals 2.2, V is the luminance control voltage, and $L_{min}$ is the minimum luminance. γ=2.2 is a setting such that luminance variation with linear change in V provides a linear brightness response. The constant α is equal to 0.4 when γ=2.2, V=100, and $L_{max}$=10000 cd/m².

$$L_x = \alpha V^\gamma + L_{min} \quad (1)$$

In Table 1, ten different luminance control voltage percentages are shown. A different number of luminance control voltage percentages may be included and used.

The FIP $L_{max}$ may be determined based on a selected contrast ratio of the FIP relative to the road surface and a nominal road luminance value. As an example, the selected contrast ratio may be 6.25 and the nominal road luminance value may be 800 cd/m² as shown in Table 1. In one embodiment, a NIP to FIP ratio is between 1:1 and 5:1. In another embodiment, a first NIP to FIP ratio is set for a first portion of a luminance dimming curve (or a first range of luminance levels of the NIP) and a second NIP to FIP ratio is set for a second portion of the luminance dimming curve (or a second range of luminance levels of the NIP). In yet another embodiment, a NIP to FIP ratio of 2:1 is maintained over a majority or most of a luminance dimming curve, as represented by NIP:FIP ratios for luminance control voltage percentages equal to and between 30% and 100% in Table 1. The NIP:FIP ratio is not 2:1 at a low end of the luminance dimming curve to avoid distracting the driver, as represented by the NIP:FIP ratios of 2.25, 2.60, 3.15 and 4.00 in Table 1 for the luminance control voltage percentages of 20%, 10%, 5% and 0%, respectively. The values in Table 1 are examples. The values are adjustable and may be different than shown. In an embodiment, the maximum and minimum luminance values of 10000 cd/m² and 2 cd/m² are fixed and the other values in Table 1 are adjustable. The values may not vary by a large amount. The values that may vary the most may be at the low end for luminance control voltage percentages less than or equal to a predetermined percentage (e.g., 30%).

At 422, the control module 216 determines a luminance level of a road surface that is not marked with, for example, lane line markings (such as a surface between lane line markings).

At 424, the control module 216 determines a luminance level to set the FIP based on the luminance level of the NIP, the luminance threshold for cognitive capture, the selected grayscale, and the luminance level of the road surface. This may be done while limiting the luminance level of the FIP to a predetermined maximum luminance level. Table 1 shows an example table for determining a maximum FIP luminance level based on a NIP:FIP ratio and a maximum NIP luminance. In one embodiment, the luminance level of the FIP is selected such that a contrast ratio between the FIP and a road surface is between 1.2:1 and 10:1.

Figure 6:
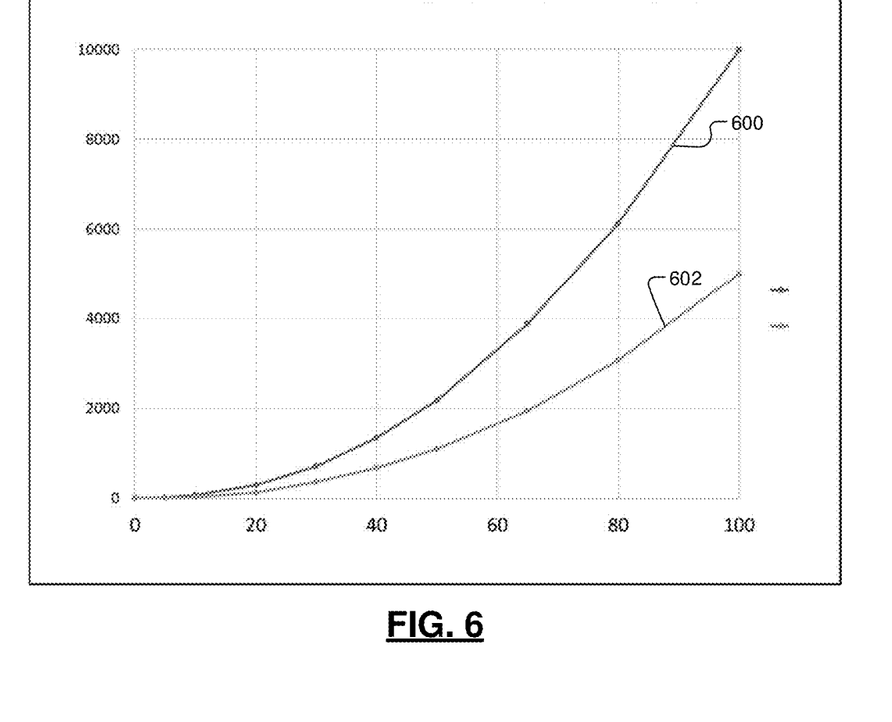
FIG. 6 is an example plot of near and far virtual image plane luminance curve values versus brightness control voltage percentages for the near virtual image plane in accordance with the present disclosure.

In one embodiment, separate luminance curves are used to relate luminance levels in the NIP with luminance levels in the FIP. The curves may be used to determine a luminance level in the FIP based on a luminance level in the NIP. FIG. 6 shows an example plot of near and far virtual image plane luminance curve values versus brightness control voltage percentages for the near virtual image plane. The luminance levels of the NIP and the FIP may be determined based on the luminance control voltage percentage for the NIP. Luminance curves 600, 602 are shown for both the NIP and the FIP and may follow a power law with gamma ($\gamma$) equal to, for example, 2.2 such that brightness varies linearly. The shapes of the near and far virtual image plane luminance curves 600, 602, which are similar to a shape of an exponential curve, are related to a relationship between luminance and a human perception of changes in brightness. The near and far virtual image plane luminance curves 600, 602 are selected such that the projection system 200 operates to provide a linear change in brightness as perceived by a driver with change in the NIP control voltage. Luminance is logarithmically related to brightness perception.

For daytime driving, the FIP navigation graphics may have a 3:1 contrast ratio relative to the surface of the road (i.e. the road surface without a lane line marking and/or other marking). This results into a nominal day luminance of the navigation graphics of 2400 cd/m². The control module 216 may control luminance levels of AR graphics in the FIP to provide a nominal day luminance level of the AR graphics to be within a predetermined range of 2400 cd/m². A daytime partly cloudy day may have a road surface luminance level of 800 cd/m². To accommodate driving in highly bright days, the maximum luminance level of the FIP may be set to 5000 cd/m². In one embodiment, the maximum luminance level of the FIP is set at 10000 cd/m².

The luminance level of the FIP determined at 420 and/or at 424 may be set such that the contrast ratio (CR) of equation 2 is satisfied, where $L_{graphicsonbackground}$ refers to the luminance level of AR graphics displayed in front of environment, $L_{background}$ is the luminance level of the environment, and $L_{graphic(measured\ in\ dark\ room)}$ is the luminance level of the AR graphics when displayed in a dark room.

$$CR = \frac{L_{graphicsonbackground}}{L_{background}} = \frac{L_{graphic(measured\ in\ darkroom)} + L_{background}}{L_{background}} \quad (2)$$

The luminance level of the environment $L_{background}$ may be detected using the ambient light sensor 218 and be equivalent to the luminance level of ambient light.

At 426, the control module 216 displays the far image, which includes AR graphics, in the FIP at the determined luminance level for the FIP. Subsequent to operation 426, the method may end at 428 or may return one of the previous operations, such as one of operations 402, 404, 406, or 412.

Since each AR graphics set displayed has a respective unique graphics luminance table and/or grayscale to follow, luminance adjustments are made via grayscale dimming based on one or more corresponding parameters. The parameters include an ambient light luminance level, a luminance threshold for cognitive capture, a luminance level of a NIP, a luminance control voltage of a NIP, a selected NIP to FIP ratio, a luminance level of a lane marking (or other object), etc. The selected NIP to FIP ratio may be determined based on a selected grayscale and/or lookup table, as described above.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples mitigate the risk of presenting distracting AR graphics to drivers via use of grayscale dimming with maximum luminance that is unique to each AR application and adjusted based on ambient luminance.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A projection system comprising:
   at least one projection device configured to project (i) a first image in a first virtual image plane, and (ii) a second image in a second virtual image plane, wherein the second virtual image plane is further from an eyebox than the first virtual image plane; and
   a control module configured to
      determine an ambient light luminance level,
      determine a first luminance level for the first virtual image plane based on the ambient light luminance level,
      determine a predetermined ratio between a second luminance level of the second virtual image plane and the first luminance level of the first virtual image plane,
      set the second luminance level of the second virtual image plane such that the predetermined ratio exists between the second luminance level of the second virtual image plane and the first luminance level of the first virtual image plane, and
      control the at least one projection device to display (i) the first image in the first virtual image plane having the first luminance level, and (ii) the second image in the second virtual image plane having the second luminance level.

2. The projection system of claim 1, further comprising an ambient light sensor configured to generate an output signal indicative of the ambient light luminance level,
wherein the control module is configured to determine the ambient light luminance level based on the output signal.

3. The projection system of claim 1, wherein the control module is configured to set the second luminance level of the second virtual image plane such that a contrast ratio between the second virtual image plane and a road surface is between 1.2:1 and 10:1.

4. The projection system of claim 1, wherein the control module is configured to:
determine whether the ambient light luminance level is less than a predetermined level associated with nighttime; and
in response to detecting that it is nighttime, set the second luminance level of the second virtual image plane such that a contrast ratio between the second virtual image plane and a road surface is between 1.2:1 and 10:1.

5. The projection system of claim 4, wherein the control module is configured to:
determine an augmented reality application for the second virtual image plane to be a navigation application; and
based on the augmented reality application being the navigation application, set the second luminance level of the second virtual image plane to be less than or equal to at least one of (i) a detected luminance level of a lane line marker, or (ii) a predetermined luminance level of a lane line marker.

6. The projection system of claim 1, wherein the control module is configured to:
determine an augmented reality application for the second virtual image plane; and
based on the augmented reality application, at least one of (i) set the second luminance level of the second virtual image plane, or (ii) select a grayscale from a plurality of available grayscales for the second virtual image plane.

7. The projection system of claim 1, wherein the control module is configured to:
determine whether the ambient light luminance level is greater than a predetermined level associated with daytime; and
in response to detecting that it is daytime, limit the second luminance level of the second virtual image plane to be less than or equal to 10000 cd/m$^2$.

8. The projection system of claim 1, wherein the control module is configured to:
determine whether the ambient light luminance level is greater than a predetermined level associated with daytime; and
in response to detecting that it is daytime, control the second luminance level of the second virtual image plane to at least one of (i) provide a nominal day luminance level of the second virtual image plane to be within a predetermined range of 2400 cd/m$^2$, or (ii) have a contrast ratio between a luminance level of augmented reality graphics displayed in the second virtual image plane and a luminance level of a surface of a road be 1.2:1 to 10:1.

9. The projection system of claim 8, wherein the control module is configured to:
determine an augmented reality application for the second virtual image plane is a navigation application; and
based on the augmented reality application being the navigation application, control the second luminance level of the second virtual image plane to at least one of (i) provide the nominal day luminance level of the second virtual image plane to be within the predetermined range of 2400 cd/m$^2$, or (ii) have the contrast ratio between the luminance level of the augmented reality graphics displayed in the second virtual image plane and the luminance level of the surface of the road be 1.2:1 to 10:1.

10. The projection system of claim 1, wherein the control module is configured to set the second luminance level of the second virtual image plane such that a first ratio between the second luminance level of the second virtual image plane and the first luminance level of the first virtual image plane exists for a first range of luminance levels of the first virtual image plane and is greater than the first ratio for a second range of luminance levels of the first virtual image plane.

11. The projection system of claim 1, wherein the control module is configured to at least one of:
permit a user to manually adjust the second luminance level of the second virtual image plane independent of the first luminance level of the first virtual image plane; and
prevent a user from manually adjusting the second luminance level of the second virtual image plane independent of the first luminance level of the first virtual image plane.

12. A vehicle system comprising:
the projection system of claim 1 configured to project the first image and the second image at a window of a vehicle; and
an input device configured to manually adjust the first luminance level of the first virtual image plane,
wherein the control module is configured to adjust the first luminance level of the first virtual image plane based on an output of the input device.

13. A projection system comprising:
at least one projection device configured to project (i) a first image in a first virtual image plane, and (ii) a second image in a second virtual image plane, wherein the second virtual image plane is further from an eyebox than the first virtual image plane; and
a control module configured to
determine an ambient light luminance level,
determine a first luminance level for the first virtual image plane based on the ambient light luminance level,
determine a second luminance level of the second virtual image plane based on the first luminance level of the first virtual image plane,
control the at least one projection device to display (i) the first image in the first virtual image plane having the first luminance level, and (ii) the second image in the second virtual image plane having the second luminance level,
determine a luminance threshold for cognitive capture based on the ambient light luminance level, and
determine the second luminance level based on the luminance threshold.

14. A method of operating a projection system, the method comprising:
determining an ambient light luminance level;
determining a first luminance level of a first virtual image plane based on the ambient light luminance level;
determining a predetermined ratio between a second luminance level of a second virtual image plane and the first luminance level of the first virtual image plane;

setting the second luminance level of the second virtual image plane such that the predetermined ratio exists between the second luminance level of the second virtual image plane and the first luminance level of the first virtual image plane, wherein the second virtual image plane is further from an eyebox than the first virtual image plane; and controlling a projection device to project (i) a first image in the first virtual image plane, and (ii) a second image in the second virtual image plane, wherein the first image is displayed in the first virtual image plane having the first luminance level, and wherein the second image is displayed in the second virtual image plane and having the second luminance level.

15. The method of claim 14, further comprising setting the second luminance level of the second virtual image plane to less than or equal to at least one of (i) a detected luminance level of a lane line marker, or (ii) a predetermined luminance level of a lane line marker.

16. The method of claim 15, further comprising:
determining whether the ambient light luminance level is less than a predetermined level associated with nighttime;
determining an augmented reality application for the second virtual image plane to be a navigation application; and
in response to detecting that it is nighttime and based on the augmented reality application being the navigation application, setting the second luminance level of the second virtual image plane to be less than or equal to the at least one of (i) the detected luminance level of a lane line marker, or (ii) the predetermined luminance level of a lane line marker.

17. The method of claim 14, further comprising:
determining an augmented reality application for the second virtual image plane; and
based on the augmented reality application, at least one of (i) setting the second luminance level of the second virtual image plane, or (ii) selecting a grayscale from a plurality of available grayscales for the second virtual image plane.

18. The method of claim 14, further comprising:
determining whether the ambient light luminance level is greater than a predetermined level associated with daytime; and
in response to detecting that it is daytime, limiting the second luminance level of the second virtual image plane to be less than or equal to 5000 $cd/m^2$.

19. The method of claim 14, further comprising setting the second luminance level of the second virtual image plane such that a ratio between the second luminance level of the second virtual image plane and the first luminance level of the first virtual image plane is 2:1 for a first range of luminance levels of the first virtual image plane and is greater than 2:1 for a second range of luminance levels of the first virtual image plane.

* * * * *